July 20, 1937.  D. G. LORRAINE  2,087,621
VALVE MOUNTING
Filed Sept. 10, 1931
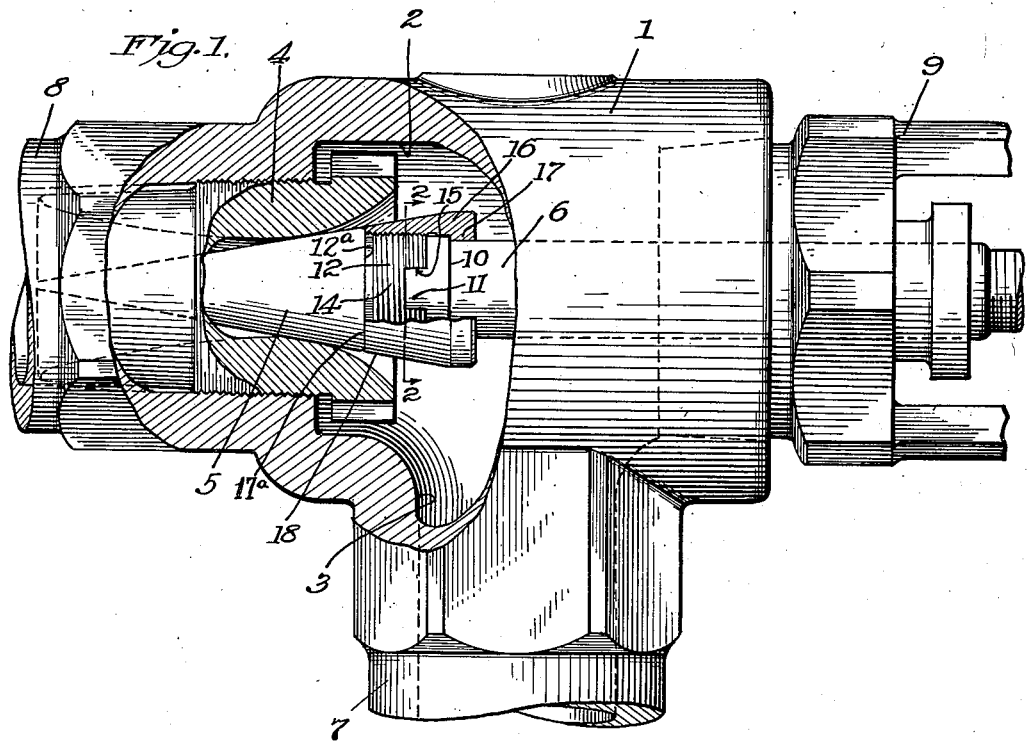
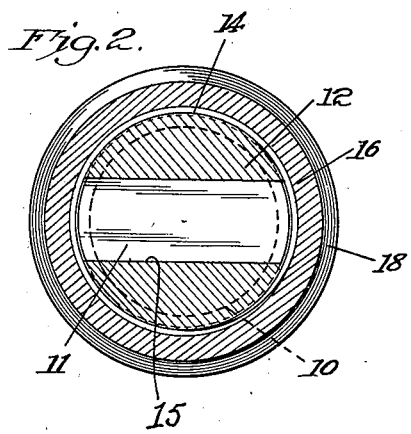
INVENTOR.
David G. Lorraine
BY R. W. Smith
ATTORNEYS.

Patented July 20, 1937

2,087,621

UNITED STATES PATENT OFFICE 2,087,621

VALVE MOUNTING

David G. Lorraine, Los Angeles, Calif., assignor of one-half to W. L. Borough and one-half to Sara R. Lorraine, both of Los Angeles, Calif.

Application September 10, 1931, Serial No. 562,050

12 Claims. (Cl. 251—27)

This invention relates to a valve mounting particularly applicable to a flow bean for controlling the flow from oil and gas wells; and has for its object to detachably assembly the valve and a cooperating supporting stem, with the valve rigidly held against chattering and in concentric alinement with its cooperating seat so as to avoid vibration and insure uniform flow past the valve for eliminating emulsion and preventing cutting-out of the valve.

It is a further object of the invention to detachably connect the valve and its supporting stem so as to positively hold the valve against rotation and avoid the possibility of accidental disengagement, with the detachable connection providing a smooth joint between the valve and stem so as to avoid flow disturbance such as would otherwise cause emulsion.

Further objects of the invention will be readily understood from the following description of the accompanying drawing, in which:

Fig. 1 is a fragmentary side elevation of a flow bean, partly in axial section and showing the improved mounting for the valve.

Fig. 2 is a detail transverse section on the line 2—2 of Fig. 1.

The improved valvular construction is illustrated as employed in a flow bean comprising a T-fitting 1, having a transverse bore 2 and a communicating longitudinal bore 3. The valvular construction comprises a throat 4 mounted in one end of bore 2, and a cooperating tapering valve 5 mounted on a valve stem 6 which projects outwardly through the opposite end of the bore 2. The outer end of bore 3 and the outer end of bore 2 beyond the throat 4 form nipples 7 and 8 adapted for engagement by pipe line (not shown); and the opposite end of bore 2 supports a rearwardly projecting yoke 9 which at its outer end engages stem 6 by a usual threaded connection (not shown), so that turning the stem is adapted to longitudinally adjust the tapering valve 5 with relation to its cooperating throat 4, in order to adjust the flow orifice which is defined by the bore of the throat.

Valve 5 is detachably connected to stem 6 for ready replacement and assembly of the parts; and the detachable connection provides a rigid mounting for the valve holding the latter against lateral or rotary displacement or accidental disengagement from its stem, and providing a smooth joint between the valve and stem, so as to completely eliminate chattering or flow disturbance, and thus avoiding vibration of the pipe line or emulsifying of the flow.

As an instance of this arrangement the end of stem 6 which engages valve 5 is provided with an annular shoulder 10, and the end face of the stem has a projecting diametrical tongue 11. The cooperating end of valve 5 has a restricted neck 12 externally threaded as shown at 14, and the end face of the threaded neck has a diametrical groove 15 adapted for reception of tongue 11. A collar 16 is internally threaded for reception on the threaded neck of the valve and has an internal end flange 17 adapted to engage the shoulder 10 for longitudinally clamping the stem firmly against the valve; and the exterior surface of the collar tapers as shown at 18 so that when the parts are operatively assembled with the tapering end 17ª of the collar longitudinally seating snugly against the shouldered base 12ª of the neck when the flanged end 17 of the collar clamps against the shoulder 10, the taper 18 forms a smooth and uniform continuation of the taper of valve 5 as shown in Fig. 1, with no depression or recess between the valve 5 and the collar 16 such as might cause flow disturbance or accumulation of sand.

The cooperating tongue and groove 11—15 thus hold the valve against rotation relative to its stem, so that the threaded collar 16 forms a positive but readily releasable locking engagement between the parts; and the tongue and groove connection cooperating with the longitudinally extending threaded engagement 14, insures longitudinal alinement of the valve with its stem and rigidly supports the valve against the possibility of chattering, so that the valve is always concentric with the bore of its cooperating throat 4.

All vibration is thus eliminated and flow past the valve is uniformly circumferentially distributed, with the smooth joint between the tapering valve and the correspondingly tapering collar 16 eliminating all flow disturbance, so as to avoid emulsifying the flow and rigidly supporting the valve while permitting of its ready replacement when worn.

I claim:

1. In combination, a throat adapted for mounting in a bore, a tapering valve cooperating with the throat, a stem for the valve adapted for shifting longitudinally of the bore for adjusting the valve relative to the throat; and means for detachably connecting the valve and stem, comprising a restricted neck on the valve, a cooperating transverse tongue and groove at end meeting surfaces of the neck and stem, a shoulder on the stem, and a collar threaded on the neck and engaging the shoulder for securing the valve and stem against relative longitudinal movement, the outer surface of the collar forming a uniform prolongation of the tapering valve.

2. In combination, a tapering valve, a stem for the valve; and means for detachably connecting the stem and valve, comprising a restricted neck on the valve, a cooperating transverse tongue and groove at end meeting surfaces of the neck and stem, a shoulder on the stem, and a collar threaded on the neck and engaging the shoulder for securing the valve and stem against relative longitudinal movement, the outer surface of the collar forming a uniform prolongation of the tapering valve.

3. In combination, a tapering valve, a stem for the valve; and means for connecting the stem and valve, comprising a neck on the valve, a shoulder on the stem, and a collar secured to the neck and engaging the shoulder, the collar having an exterior tapering surface merging into the exterior surface of the valve whereby fluid may be directed in a diverging path along the exterior surface of the valve and collar without abrupt change in its direction of flow.

4. In combination, a tapering valve, a stem for the valve; and means for connecting the stem and valve, including means for positively holding the valve and stem against relative rotation, the connecting means having an exterior surface which is a uniform prolongation of the tapering valve.

5. In combination, a tapering valve, a stem for the valve; and means for connecting the stem and valve, comprising a neck on the valve, a shoulder on the stem, means for positively holding the neck and stem against relative rotation, and a collar secured on the neck and engaging the shoulder, the surface of the collar forming a uniform prolongation of the tapering valve.

6. In combination, a tapering valve, a stem for the valve; and means for connecting the stem and valve, comprising a neck on the valve, a shoulder on the stem, means for positively holding the neck and stem against relative rotation, and a collar secured on the neck and engaging the shoulder, the collar having an exterior tapering surface merging into the exterior surface of the valve whereby fluid may be directed in a diverging path along the exterior surface of the valve and collar without abrupt change in its direction of flow.

7. In combination, a tapering valve, a stem for the valve; and releasable means for connecting the stem and valve, said connecting means having a tapering exterior surface merging into the surface of the tapering valve.

8. In combination, a tapering valve, a stem for the valve; and releasable means for connecting the stem and valve, said connecting means longitudinally seating snugly against the valve and having a tapering exterior surface merging into the surface of the tapering valve.

9. In an adjustable flow nipple, a restricted throat, a valve tapering to appreciably restricted cross-sectional area at its forward end and adapted for longitudinal adjustment in the bore of the throat, a stem for the valve, means at the proximate ends of the valve and stem for drawing the valve and stem toward one another and holding the valve and stem against relative longitudinal displacement, and means including a cooperating projection and socket at the back of the tapering valve for holding the valve and stem against relative rotation, the collar seating tightly against the back of the tapering valve with the exterior surface of one of said holding means including a detachable collar on the stem and merging into the exterior surface of the tapering valve, the collar being detachable by retraction along the stem away from the valve, with detachment of the collar releasing that holding means of which it is a part and permitting release of the other of said holding means.

10. In an adjustable flow nipple, a restricted throat, a valve tapering to appreciably restricted cross-sectional area at its forward end and adapted for longitudinal adjustment in the bore of the throat, a stem for the valve, means at the proximate ends of the valve and stem for drawing the valve and stem toward one another and holding the valve and stem against relative longitudinal displacement, and means including a cooperating projection and socket at the back of the tapering valve for holding the valve and stem against relative rotation, one of said holding means including a detachable collar on the stem and seating tightly against the back of the tapering valve, the collar being detachable by retraction along the stem away from the valve, with detachment of the collar releasing that holding means of which it is a part and permitting release of the other of said holding means.

11. In an adjustable flow nipple, a restricted throat, a valve tapering to appreciably restricted cross-sectional area at its forward end and adapted for longitudinal adjustment in the bore of the throat, a stem for the valve, means at the proximate ends of the valve and stem for drawing the valve and stem toward one another and holding the valve and stem against relative longitudinal displacement, and means including a cooperating projection and socket at the back of the tapering valve for holding the valve and stem against relative rotation, one of said holding means including a collar on the stem in back of the tapering valve, the collar being detachable by retraction along the stem away from the valve, with detachment of the collar releasing that holding means of which it is a part and permitting release of the other of said holding means.

12. In an adjustable flow nipple, a restricted throat, a valve tapering to appreciably restricted cross-sectional area at its forward end and adapted for longitudinal adjustment in the bore of the throat, a stem for the valve, means at the proximate ends of the valve and stem for drawing the valve and stem toward one another and holding the valve and stem against relative longitudinal displacement, and cooperating means at the back of the tapering valve abutting in planes extending in the direction of the axis of the valve and stem for positively holding the valve and stem against relative rotation, one of said holding means including a collar on the stem in back of the tapering valve, the collar being detachable by retraction along the stem away from the valve, with detachment of the collar releasing that holding means of which it is a part and permitting release of the other of said holding means.

DAVID G. LORRAINE.

CERTIFICATE OF CORRECTION.

Patent No. 2,087,621.   July 20, 1937.

DAVID G. LORRAINE.

It is hereby certified that error appears in the printed specification of the above numbered patent requiring correction as follows: Page 2, second column, line 3, claim 9, for the words "the collar" read one of said holding means including a detachable collar on the stem and; and lines 5, 6 and 7, same claim, for "one of said holding means including a detachable collar on the stem and" read the collar; and that the said Letters Patent should be read with these corrections therein that the same may conform to the record of the case in the Patent Office.

Signed and sealed this 5th day of October, A. D. 1937.

Henry Van Arsdale (Seal)

Acting Commissioner of Patents.